(12) United States Patent  
Edwards et al.

(10) Patent No.: US 8,174,405 B2  
(45) Date of Patent: May 8, 2012

(54) MESSAGE-BUS-BASED ADVANCED METER INFORMATION SYSTEM WITH APPLICATIONS FOR CLEANING, ESTIMATING AND VALIDATING METER DATA

(75) Inventors: Cree Adams Edwards, Woodside, CA (US); Larsh Maur Johnson, La Jolla, CA (US); Christopher Slaboszewicz King, Berkeley, CA (US); Narendra Prasad, Sunnyvale, CA (US); John Olson Wambaugh, Brookdale, CA (US); Thomas David Lofgren, Los Gatos, CA (US)

(73) Assignee: Emeter Corporation, San Mateo, CA (US)

(*) Notice: Subject to any disclaimer, the term of this patent is extended or adjusted under 35 U.S.C. 154(b) by 1272 days.

(21) Appl. No.: 11/846,504

(22) Filed: Aug. 28, 2007

(65) Prior Publication Data

US 2008/0074284 A1    Mar. 27, 2008

Related U.S. Application Data

(60) Provisional application No. 60/840,629, filed on Aug. 28, 2006.

(51) Int. Cl.  
*G08B 23/00* (2006.01)

(52) U.S. Cl. .............. 340/870.02; 700/291; 702/62; 702/188

(58) Field of Classification Search ............ 340/870.02; 700/291; 702/62, 188  
See application file for complete search history.

(56) References Cited

U.S. PATENT DOCUMENTS

| | | | |
|---|---|---|---|
| 6,088,659 A | * | 7/2000 | Kelley et al. ................ 702/62 |
| 6,820,045 B1 | | 11/2004 | Asano et al. |
| 7,043,459 B2 | | 5/2006 | Peevey |
| 7,392,115 B2 | | 6/2008 | Schindler |

OTHER PUBLICATIONS

USPTO, Final Office Action mailed in related U.S. Appl. No. 11/846,501 on Aug. 5, 2011, 12 pages.
"Message Bus," Microsoft Patterns & Practices, http://msdn.microsoft.com/en-us/library/ff647328 (d=printer).aspx, 2001, 10 pages.
USPTO, Non-Final Office Action mailed in related U.S. Appl. No. 11/846,501 on Nov. 10, 2010, 12 pages.

* cited by examiner

*Primary Examiner* — Albert Wong  
(74) *Attorney, Agent, or Firm* — Davis Wright Tremaine LLP

(57) ABSTRACT

Different adapters and applications may publish information on the messaging bus and retrieve information from the bus simultaneously in a manner that does not cause interference or problems in the publication or retrieval. Meter data is cleaned, validated and estimated by separate applications using the above-described application and retrieval processes via the message bus for flexible and efficient processing.

16 Claims, 3 Drawing Sheets

MESSAGE-BUS-BASED ADVANCED METER INFORMATION SYSTEM WITH APPLICATIONS FOR CLEANING, ESTIMATING AND VALIDATING METER DATA

CROSS-REFERENCE TO RELATED APPLICATION

This non-provisional application claims the benefit of provisional application No. 60/840,629, filed Aug. 28, 2006, and is related to the companion application, entitled "SYSTEM AND METHOD FOR MESSAGE-BUS-BASED ADVANCED METER INFORMATION SYSTEM," filed on the same day as this application, which applications are incorporated herein in their entireties by this reference.

TECHNICAL FIELD

The present invention relates to a system and method for implementation of an advanced meter information system that is architected around a messaging bus.

BACKGROUND

Utilities initially managed data collected from meters that record customer consumption using databases that are part of the utility billing systems. Two decades ago, utilities began to implement specialized software that retrieved meter data remotely via a communications network, such as a telephone system. Such software typically has a database in which the metered usage data is stored; with a portion of the data forwarded to either the utility's billing system for billing of customers or its load research system for analysis. More recently, utilities have begun implementing "meter data management systems," which are databases independent of the meter data collection system.

Meter data management systems implemented by the utilities receive meter data from the meter data collection system, validate the data, store the data in a repository, and forward the data to other systems, including billing, load research, and outage management. Existing meter data management systems are implemented through custom, point-to-point interfaces to the meter data collection system and to the utility systems receiving the data. Also, such systems are implemented via a set of applications, that perform manipulation of data before or after it is stored in the repository. In many meter data management systems, each application operates on its own, taking data from one source, manipulating it, and delivering it directly to its destination.

Any substantial change made to any element in the chain from data retrieval to delivery requires that each element of the chain be modified to reflect the modification in the changed element. As noted above, the various systems employed for conventional meter data management are not interoperable. The result is that this modification process can be cumbersome, and is performed by means of redundant interfaces that must be developed and maintained. Each of these interfaces may have its own operating and management requirements. It is therefore desirable to provide a meter information system with improved characteristics compared with existing approaches.

SUMMARY OF THE INVENTION

The above-described difficulties may be alleviated by the use of an improved meter data management computer system where a message bus is employed for communication so that the flow of information can be controlled efficiently, and the overall system architecture is simplified. In one embodiment, a meter data management computer system communicates with a meter data collection system which collects meter data recording utility usage, and with an application software system, such as for example a utility application software system that performs the billing function as one of its functions. The meter data management computer system has a number of interfaces including those to the meter data collection system and the application software system. The computer system also includes a database storing meter data or information derived from the meter data and an application that inserts the meter data or information derived there from into the database. The computer system utilizes a message bus for transferring the meter data or information derived from the meter data and messages related to the meter data between the meter data collection system, the application, the database, the interfaces and the application software system. The use of the message bus greatly facilitates the communication between the various components of the meter data management system, and between the meter data management system and external systems.

In another embodiment, a meter data management computer system includes a number of interfaces including those to the meter data collection system and the application software system, and a message bus for transferring information related to meter data between the meter data collection system, the interfaces and the application software system. In this embodiment, at least a first interface publishes on the message bus a message related to the meter data and the second interface retrieves the message from the message bus. This allows information to be passed between the meter data collection system, the meter data management computer system and the application software system.

In still another embodiment of the invention, a data collection interface is employed to interface with the meter data collection system. A number of software applications for cleaning, validating and estimating meter data are employed. One of the software applications retrieves meter data from a message bus and cleans or validates the retrieved meter data.

In yet another embodiment of the invention, a data collection interface is employed to interface with the meter data collection system. A number of software applications for cleaning, validating and estimating meter data are employed. A message bus transfers meter data or information derived from the meter data between the meter data collection system, the data collection interface and the software applications. By employing a number of different software applications to perform the functions of cleaning, validating and estimating meter data, where the software applications communicate with one another and with the data collection interface through the message bus, efficiency and flexibility of the cleaning, validating and estimating functions performed by the software applications are improved.

All patents, patent applications, articles, books, specifications, standards, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

For simplicity in description, identical components are illustrated by the same numerals in this application.

DETAILED DESCRIPTION OF EXEMPLARY EMBODIMENTS

In one embodiment, the above described problems with conventional meter data management systems can be alleviated by an advanced meter information system with an architecture that links the applications and databases via a message bus to allow each element to operate independently and to be modified independently. Rather than taking data from one system, processing it, and delivering it directly to another system, the message-bus-based approach allows systems to retrieve data published on the bus by any connected application or system and to publish data to the bus for any application or system that has access to that data on the bus. Applications can be added to or subtracted from the message-bus-based meter data management system without affecting the operation of any other application, except for no longer providing expected data. Another benefit is the ability to implement more reliable, flexible, and easier synchronization processes between various systems linked to the advanced meter information system, such as the utility's billing system.

Use of the messaging bus allows the advanced meter information system, as compared to currently available meter data management systems, to be more scaleable, more easily integrated with utility or other application software systems, more easily integrated with meter data collection systems, faster in data manipulation capability, and more flexible.

Figure 1:
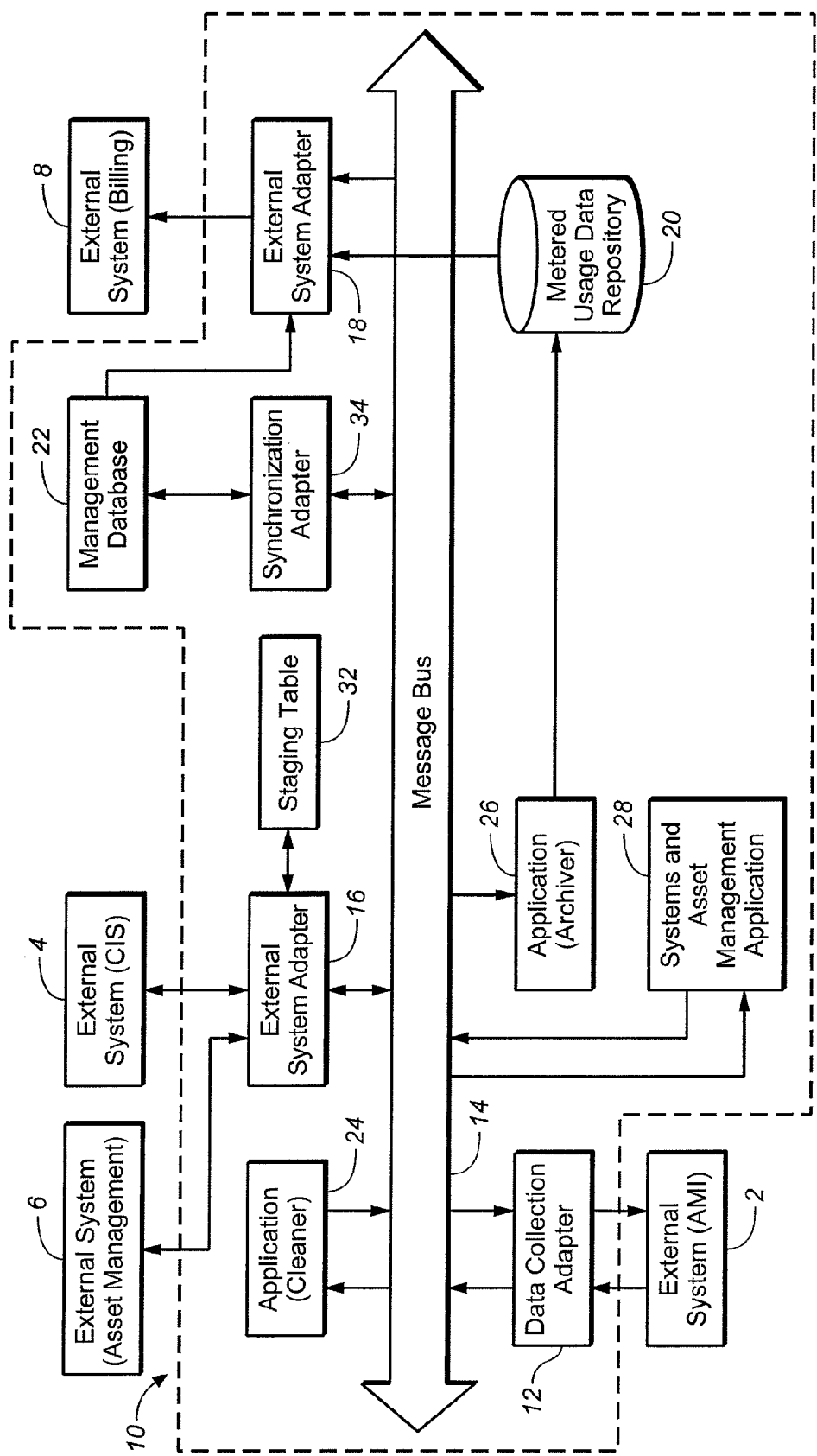
FIG. 1 is a block diagram of a meter data management computer system in communication with a number of different external systems to illustrate one embodiment of the invention.

FIG. 1 is a block diagram illustrating one embodiment of the invention. As shown in FIG. 1, in communication with the meter data management system 10 (in the dotted line box) are a number of external systems, including a meter data collection system 2, which may include a number of different meter data collection servers (not shown) that collect data read by a number of different meters as well as other information related to the meter data read. Such information may include for example time intervals for reading the meters, such as every 15 minutes or every hour. The related information may also include information concerning malfunction of the meters and power outages as well as the format of the meter data. One possible example of an external system 4 is a customer information system (CIS). Through system 4, a customer (such as a utility company) is able to supply to the meter data management computer system 10 information concerning customer utility services, such as account information, rates, cycle, route, premise, service delivery points, service agreements, customers, and changes in the above information. In other words, system 4 will send the computer system 10 information concerning any one of the above items and changes thereof. Power outage information, meter malfunction information, SDP status information etc. can and does flow from system 10 to system 4 as well. For this reason, the arrows labeling the signal lines between system 4, adapter 16 and bus 14 are bidirectional.

External system 6 manages assets such as utility meters and communication devices (not shown) that transmit readings or other information concerning the meters to the meter data collection servers in system 2. System 6 also manages requests for meter changes and other problems such as bad communication devices, scrap meters etc. External system 8 receives meter data and information related to the meter data from system 10 for billing purposes. External systems 2, 4, 6 and 8 are external application software systems.

The meter data management computer system 10 includes a number of interfaces to the external systems 2, 4, 6 and 8. Thus the interface to system 2 includes a data collection adapter 12 that processes the meter data and information related to the meter data from system 2 and publishes the processed data on the message bus 14. Adapters 12, 16 and 18 are software components which are part of interfaces to the message bus 14, connecting the external systems 2, 4, 6 and 8 to bus 14 through signal lines. Data collection adapter 12 is able to process the meter data in different data formats and information related thereto from many different types of meters, so that the data published by adapter 12 on the message bus can be easily understood by other components and systems in FIG. 1.

Systems 4 and 6 communicate with message bus 14 through external system adapter 16; while in FIG. 1, systems 4 and 6 share the same adapter, it will be understood that they may be connected to message bus 14 through two different adapters. System 8 is connected to message bus 14 through adapter 18. The metered usage data repository 20 is used to store the meter data or information related or derived from the meter data. Management database 22 is used to store relationship data such as information concerning the customer, accounts, rate cycle, route, premise, service delivery points, service agreements and other information. While in the embodiment of FIG. 1, the two databases 20 and 22 are shown as separate databases, it will be understood that they may be combined into a single database. Such and other variations are within the scope of the invention.

Figure 3:
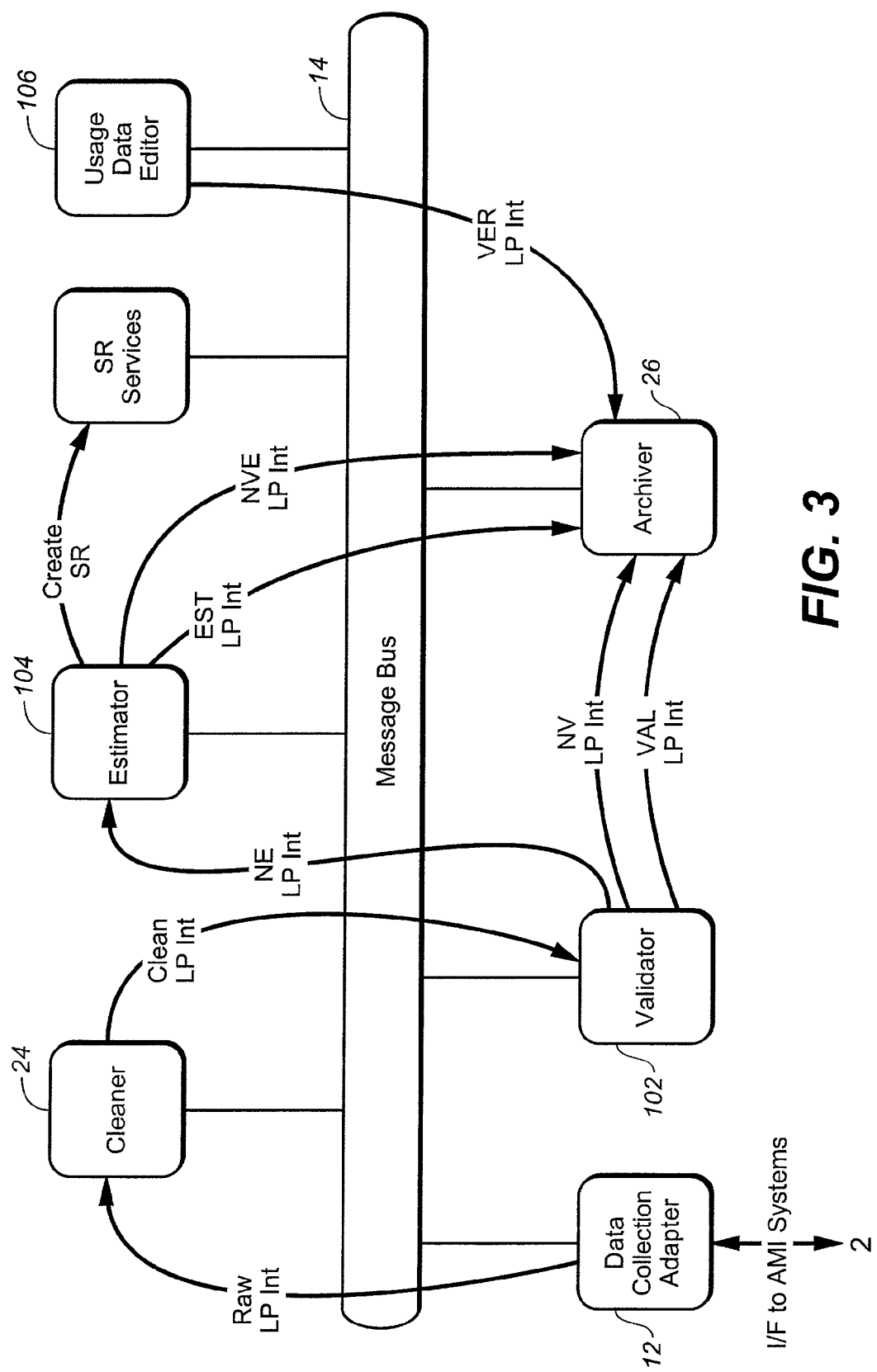
FIG. 3 is a block functional diagram of a portion of the system in FIG. 1 useful for illustrating another embodiment of the invention.

Included in computer system 10 of FIG. 1 are a number of applications. A cleaner application 24 cleans the meter data from adapter 12 and publishes the cleaned meter data to message bus 14. Shown more clearly in FIG. 3 are additional applications such as a validator and an estimator for validating and estimating the meter data in a manner described in more detail below. Cleaner application 24 and the additional applications are connected in two-way communication with message bus 14. An archiver application 26 retrieves information concerning the meter data from message bus 14 and stores the information in repository 20.

A systems and asset management application 28 retrieves information concerning systems and assets managed by external system 6. For example, application 28 may retrieve from the message bus 14 information originating from system 6 and published by adapter 16 concerning a meter change at a particular service delivery point, such as where one meter is being replaced by another meter at the particular service delivery point. This change in meter information is then published by application 28 on message bus 14 and retrieved by adapter 12 which in turn informs the appropriate meter data collection server in system 2 that the meter that has been replaced is no longer in service so that any data read from such meter is invalid and that meter data will need to be read from the new meter at the service delivery point specified. This change in meter information is also retrieved by adapter 18 and supplied to system 8 for billing purposes so that the billing for the meter data read can be traced to the correct meter at the particular service delivery point. This change in meter information may also be archived by archiver 26 and stored in repository 20.

When the utility customer has moved to a different location, this customer location change information is supplied by the CIS system 4 to adapter 16 which publishes this information on message bus 14, retrieved by adapter 18 and supplied to external system 8 so that utility bills may be sent to the correct location of the customer. This customer location change information is also supplied by adapter 16 to management database 22. This information is also retrieved by application 28 as well as other applications and adapters within system 10 and utilized for updating data between the database 22 in system 10 and the external systems.

In the event that a service delivery point or location needs to be have its utility service disconnected, such as when a customer of the utility company fails to pay utility bills, the CIS system 4 of the utility company will cause a message for disconnecting a particular meter at the service delivery point or location to be published by adapter 16 on bus 14. This message will be retrieved by adapter 12, and transmitted to system 2. System 2 will then be able to disconnect the utility service at that service delivery point or location, and stop reading meter data from the meter from that service delivery point or location.

The management database 22 stores relationship data between service delivery points to utility meters. Database 22 also stores relationship data between service delivery points and one or more of the following: customer account, power disconnection switches, data communication devices, electrical distribution transformers and electrical distribution feeders. Database 22 also stores relationship data concerning customers, utility rates, routes, cycles, premises and service agreements.

In one embodiment of the invention, information may be published by different applications and the adapters simultaneously so that no adapter or application will need to wait until the publication of information by another application or adapter has been completed. This greatly improves the flexibility and communication efficiency between the various systems and components in FIG. 1. In turn, the different applications and adapters will retrieve only the information that is pertinent to it and ignores the remaining information that is present on the message bus 14. In one embodiment, this may be implemented by using an identifier to indicate the nature of the information that is being published by any application or adapter on message bus 14. As one example, the information that is being published on message bus 14 may employ an identifier name that so indicates. For example, for meter data that is published by adapter 12 on message bus 14, the identifier containing the meter data may use a name such as "e.meter.read" or "e.meter.ondemand." In this manner, when this information is read by a particular application or adapter in FIG. 1, the application or adapter may determine whether the information is of interest to it based on the identifier "read" or "ondemand." If a particular predetermined identifier of an information indicates to an adapter or application that the information is of interest to the adapter or application, then the adapter or application will retrieve the information and process it. Otherwise, the information will be ignored and not processed by the application or adapter. Thus an adapter or application may retrieve only information with a particular identifier or flags. For example, the application or adapter may retrieve only information with certain flags that are listed in a particular pre-stored table in the application or adapter. Other manners of indicating the nature of the information published may also be used and are within the scope of the invention.

Using the above mechanisms of publication and retrieval of information by the various adapters and applications through message bus 14, it is then possible for data to be efficiently transferred between the meter data collection system 2 and repository 20. For example, the meter data that has been processed by adapter 12 and application 24 may include estimated meter data (produced in a process explained below) that is stored in repository 20. After the actual data that is being estimated has been belatedly read after the estimation, and published by adapter 12 on message bus 14, this data is retrieved by archiver 26 and stored in repository 20 to replace the estimated data to update the data in repository 20 and the external system 2. Thus adapter 12 and application 26 will cooperate to perform this update. The updated meter data replacing the estimated meter data in repository 20 may also be retrieved by adapter 18 and sent to external system 8 so as to update the meter data stored in system 8 (by replacing the estimated data with the actual read data), so that the customer may be billed on the basis of the actual meter data read rather than the estimated data. In this manner, the data stored in the external system 2 is then updated with the data stored in repository 20 as well as in the external system 8.

Thus as described above, the information that is published on message bus 14 may comprise two general categories. One general category comprises the collected meter data or information derived from the meter data, such as the processed, cleaned, validated or estimated meter data. This general category of information is referred to herein as meter data or information derived from the meter data. Another general category comprises information concerning other aspects such as customer account information, rates, cycles, route premises, service delivery points, service agreements, meters, and communication devices. This general category of information is referred to herein as messages or information related to the meter data.

The message bus 14 may be a computer bus that is managed by a controller using commercially available systems. One such suitable system is one provided by Tibco. The details of the system provided by Tibco are described in http://power.tibco.com/pubslib/lib/eb/rv/html/wwhelp/wwhimpl/common/html/wwhelp.htm?cont ext=a&file=rv_conc5.htm#wp1110992, so that detailed operation of the message bus 14 need not be described herein. The various databases and other components of FIG. 1 may also be ones commercially available. One suitable set of database and components can be found in Siebel architecture available from Oracle Corporation, Redwood Shores, Calif.

When an external system, such as the CIS system 4, wishes to publish information to bus 14, in one implementation, the corresponding adapter such as adapter 16 may first store information from the external system in a staging table, such as table 32. The corresponding adapter then sorts the information and determines the relevant information in the staging table that needs to be published.

To enable systems and business processes to have the most recent information, such as rate changes, meter changes and premise condition changes, it is desirable to synchronize this information that is available from the various external systems with the information in the management database 22. In this manner, all of the up to date information is centralized in the management database 22, instead of being dispersed amongst a number of different systems. All an external system (or a module in system 10) needs to do to find the most up to date information is to query the management database 22. This is accomplish in one embodiment by means of synchronization adapter 34. In this embodiment, adapter 34 listens to the information published on bus 14, and finds the records on the bus that it needs to update the corresponding records in the management database 22. This information is retrieved by adapter 34 and used to update the corresponding records in the management database 22. The external system 8 for billing is able to access directly information stored in the management database 22 and in the repository 20 without going through the bus 14. Where a Siebel database is used for management database 22, a synchronization Siebel request may be employed in the above process.

Figure 2:
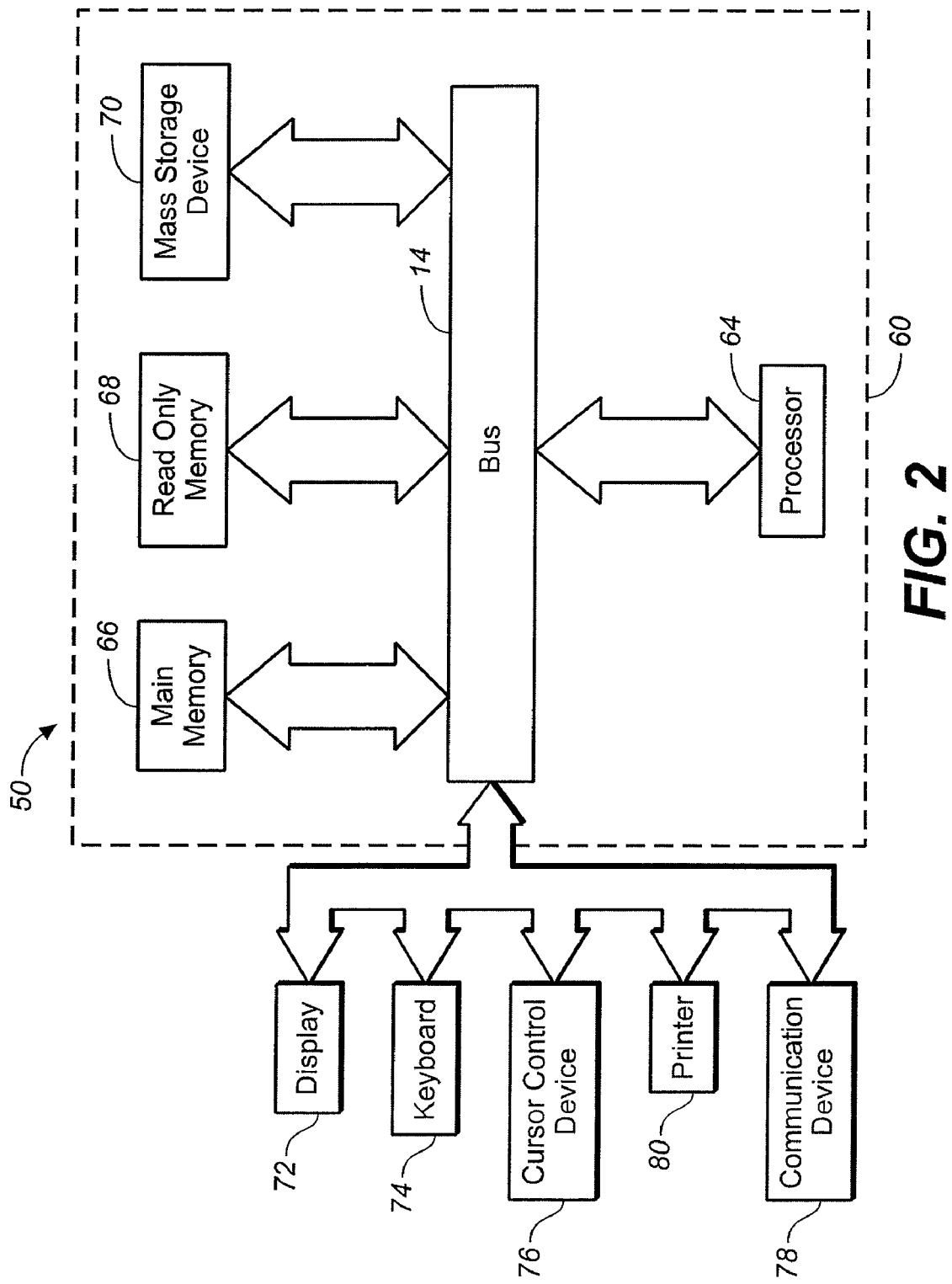
FIG. 2 is an example of a computer system for implementing the meter data management computer system of FIG. 1.

FIG. 2 is a block diagram of a computer system suitable for implementing the meter data management computer system of FIG. 1. As shown in FIG. 2, the computer system 50 includes a computer bus which may serve as the message bus 14. The various adapters and applications are software stored in the mass storage device 70. Processor 64 reads the adapter (12, 16, 18, 34) and application (24, 26, 28) software from device 70 into the main memory 66 and executes the code in the software in a manner known to those skilled in the art to perform the various functions described above. Repository 20 and database 22 may reside in the mass storage device 70. The computer system 50 may be operated by the user via keyboard 74 and cursor control device 76. Computer system 50 communicates with external systems such as external systems 2, 4, 6, 8 in FIG. 1 through communication device 78, which may be a modem or a wireless communication device such as WI-FI, Blue Tooth, infrared systems, or radio waves systems. Display 72 and printer 80 may be used to print or display information present on the bus 14, such as a list of meters, meter data, lists of meter "reads" with problems (to high/low, for example). Such printed or displayed information will enable the operator to perform various functions. Thus, each of the interfaces with adapters 12, 16, 18 shown in FIG. 1 includes the communication device 78 as well as adapter software code stored in device 70.

FIG. 3 is a block diagram of a portion of the system in FIG. 1 to illustrate another embodiment of the invention. The cleaning, validating and estimating functions performed by system 10 of FIG. 1 are illustrated more clearly in FIG. 3. As shown in FIG. 3, adapter 12 publishes on message bus 14 the raw load profile interval (raw LP int) meter data on the message bus 14. This information is retrieved by the cleaner application 24, which cleans the raw data to provide cleaned meter data which is published on message bus 14 with an indicator to indicate the nature of the information as described above. The validator 102 retrieves the cleaned meter data from bus 14 and determines whether the cleaned meter data is valid or not. If the validator 102 determines that there are data gaps in the cleaned meter data, and that the gaps in the meter data are such that the cleaned meter data can be remedied by estimation, the validator 102 will then publish on the message bus the cleaned meter data with an indicator that the cleaned meter data needs estimation. This is indicated by a flag "NE" that is either used to tag the data, or is used in the information name as described above. If the validator 102 determines that the cleaned meter data is valid so that no estimation is necessary, validator 102 will then publish the cleaned meter data information with a flag "VAL". This information will then be retrieved by the archiver 26 instead of the estimator 104 for storage to the repository 20. When the cleaned meter data is of such a nature that missing data gaps cannot be remedied by the estimator 104, the validator 102 will also publish the meter data information on bus 14, but this time with the flag "NV." This indicates that the meter data information will need to be handled in another manner other than by using the estimator, such as manually. This information is then also retrieved by archiver 26 instead of estimator 104. This data may then be retrieved by a user data editor application 106 so that the information can be further processed.

If validator 102 publishes the meter data information on bus 14 with the flag "NE," the estimator 104 will retrieve and not ignore the information. If the estimator 104 finds that it is able to fill in the gaps in the meter data, it will perform the estimated function to provide the missing meter data from other meter data (e.g. by interpolation from past meter data from the same meter) and publish the modified data to bus 14 with a flag "EST". This information is then retrieved by archiver 26 and stored in repository 20. However, if the estimator 104 determines that the missing meter data is of such a nature that it is unable to fill in the gaps, it will also publish the meter data information to bus 14 but this time with a flag "NVE." This indicates that the meter data is not ready to be used but will need further processing. Archiver 26 then retrieves the information and stores it in depository 20. Usage data editor 106 then retrieves this information from archiver 26 for further processing. Information is sent in the form of electrical signals along message bus 14 and the various signal lines in FIGS. 1-3

As shown by the process above, the configuration in FIG. 3 is particularly flexible and efficient. As noted above, when the validator 102 determines that the meter data it receives is valid so that no estimation is necessary, it can so indicate in the flag so that the estimator 104 will not process the information and it will go directly to archiver 26 for storage in repository 20.

Attached as appendices A, B and C and made a part of this application are three articles:

1. "eMeter Executive Brief: Advanced Metering Information Systems," by eMeter;

2. "eMeter Executive Brief: TXUED Case Study," by eMeter; and

3. "Additional Information for Message Bus-Based MDMS Patent Application," by eMeter.

While the invention has been described above by reference to various embodiments, it will be understood that changes and modifications may be made without departing from the scope of the invention, which is to be defined only by the appended claims and their equivalents.

eMeter Executive Brief:

Advanced Metering Information Systems

Introduction eMeter's mission is to help utilities maximize the value of their advanced metering infrastructure ("AMI") and fixed network AMR[1] investments.

Most utilities that have deployed an AMI realize that there is a gap between a utility's existing IT infrastructure and the systems and tools provided by advanced metering systems and suppliers. This gap exists because most utility information systems have been built around monthly meter reading cycles and to manage simple mechanical meters. These systems have not had to contend with the new complexity driven by electronic metering and communications systems delivering data every day. Traditional AMI solutions stop at data collection and network management leaving a gap that has generally been filled with a custom, proprietary integration by the AMI equipment supplier and a utility IT team. All too often these integrations provide only meter readings for monthly billing and fail to take advantage of the AMI's full capabilities. A flexible, multi-function Advanced Metering Information System ("AMIS") is required to bridge the gap and fully integrate the AMI with utility business processes.

Without integration an advanced, automated, metering infrastructure may just be a substitution of technology for manual meter reading. And that doesn't make the business case.

While there are some meter data management systems on the market, until now none has addressed the essential requirement that AMI data, and metering assets and services that generate it, be managed in an integrated, holistic manner. Existing asset management solutions aren't able to generate the Key Performance Indicators and Business Process Monitoring demanded by the new complex meter assets including communications modules, new measurement capabilities and configurations. Current business processes for maintaining mechanical meters aren't able to handle the new complexities of an AMI system.

Without an AMIS the costs of operating and maintaining an AMI go up, while many of the desired benefits are not realized; together, these factors can break the business case.

This paper will further describe the challenges posed by an advanced metering infrastructure, how a new class of information systems can address those challenges generally, and how eMeter's solution specifically helps a utility realize the benefits of an AMI.

---

[1] Throughout this paper we will use Advanced Metering Infrastructure or "AMI" to refer to systems that provide on-line, fixed network-based remote meter reading. This term includes systems that are conventionally referred to as Automated Meter Reading systems.

The Challenge

By definition an advanced metering system produces far more information than conventional metering and meter reading processes. However, most utility systems have been implemented to support only the basic business processes associated with revenue cycle services (monthly billing and off-cycle reads). The limitations of existing systems implementations and processes represent a major barrier to realizing the benefits of an AMI system as illustrated in Figure 1. And yet it's not practical to discard or re-implement these major systems and investments to leverage an AMI solution.

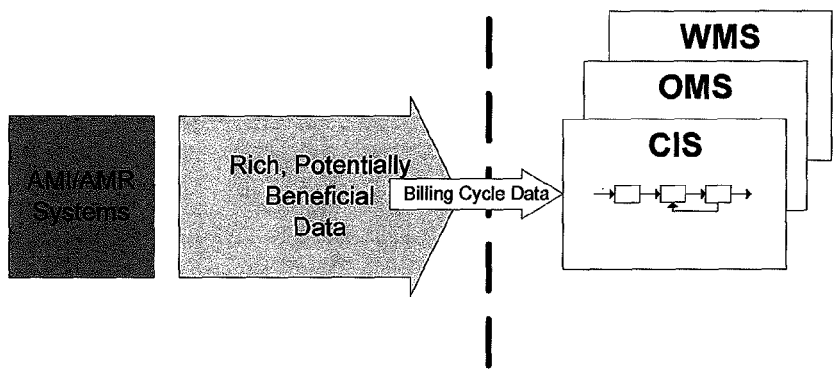

Figure 1 – Limitations due to integration with legacy applications

This challenge is compounded when multiple non-interoperable AMI technologies are deployed and the utility must also maintain certain manual meter reading processes. Figure 2 illustrates the problem of integrating multiple solutions with the many different utility applications. Not only are there many redundant interfaces that must be developed and maintained, but even with these interfaces in place, the individual AMI systems each have their own operating and management requirements.

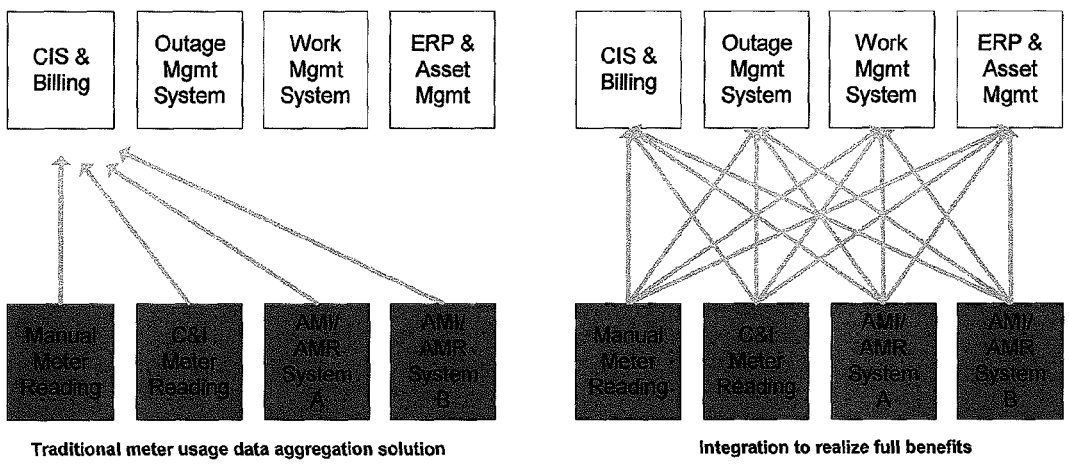

Figure 2 – Multiple Technologies imply a web of independent interfaces

The Solution: Advanced Metering Information System

An Advanced Metering Information System ("AMIS") bridges the gap between each of the meter and data collection technologies and all the potential utility applications.

**While the AMI and data collection systems focus on reading meters and coordinating communications with network endpoints, the AMIS provides centralized metered usage data, system asset and administrative data, and automated business process management tools to manage the *entire* AMI solution and meet operating cost and performance objectives.**

The AMIS allows a common interface into each legacy application, independent of the AMI system, and makes information available across the enterprise to utility users, customers and partners.

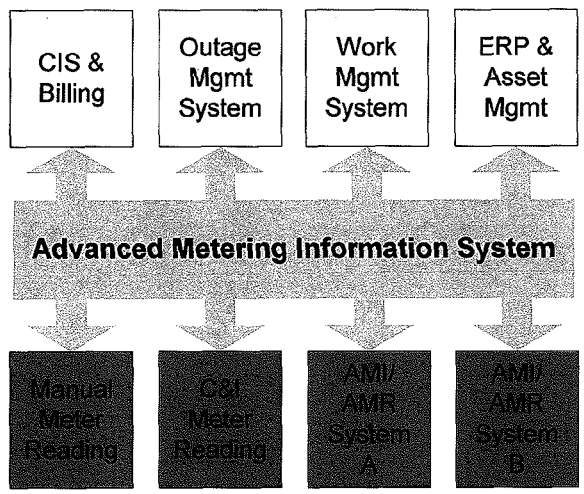

Figure 3 – AMIS Links AMI/AMR Systems to Utility Applications

Power Information Platform™ by eMeter

The *Power Information Platform*™ by eMeter ("*PIPe*™") software was developed as an AMI technology-independent AMIS designed to support all aspects of small and large-scale AMI implementations. The *PIPe* completes a utility's AMI using a Common Information Model specifically designed to capture the complex relationships between assets, premises, customer accounts, users, applications and services that must be managed in any successful AMI program. Incorporating automated business processes and workflows, the *PIPe* maintains these relationships throughout the dynamic environment of an AMI deployment and the routine moves and changes of customers, meters, and services. Through its unique Business Process Management capabilities, the *PIPe* also supports the implementation of customer energy programs such as demand response, critical peak pricing and other energy related marketing activities.

"Best Fit" *PIPe* Implementation eMeter offers several ways for a utility to reap the benefits of a *PIPe* implementation:

*Licensed AMIS*
If a utility is deploying or has deployed a large-scale AMI network the *PIPe* may be licensed, configured, and installed in a utility data center with eMeter providing implementation services and software maintenance/support.

*Managed AMIS*
For utilities that seek to build assets but reduce operating expenses, eMeter offers a "managed implementation" where the *PIPe* is licensed, configured and operated from a utility or third party data center with system operation administered by eMeter experts under a services contract.

*PIPe-on-demand*
eMeter offers an Application Service Provider ("ASP") option delivering *PIPe* services from its Managed Data Center on a subscription basis allowing even small-scale AMI programs to realize the benefits of an enterprise-class AMIS.

*Outsourced AMI Operations*
eMeter is a leader in full turnkey AMI business process outsourcing ("BPO"). Leveraging the *PIPe*, eMeter can augment the utility team to support all the one-time startup processes including materials requirements planning and logistics, field installation management, as well as on-going data collection and AMIS operations.

Other complimentary services from eMeter include:

*AMI Operations Support*
In addition to its AMIS offerings, eMeter offers world-class operations of most major AMI solutions on the market today. Over eight different metering and communications solutions are pre-integrated with the *PIPe*, including multiple wireless technologies, power line carrier, Internet and telephony. eMeter's AMI operations services support residential, commercial and industrial customers based on the utility's preferred AMI and meter provider.

*Professional Services*
eMeter supports the utility's AMI implementation with its extensive professional services ranging from business case and regulatory services to technology and systems integration. eMeter's AMIS implementations focus on managing the total cost of ownership of an AMI through automating support and maintenance processes. With the *PIPe* the utility not only realizes the benefits of an AMI, but minimizes the on-going cost of operations and risk of achieving the desired results.

Utility Benefits

Ensure a Return on AMI Investment
As noted above, the challenges of fully leveraging the rich information available from an AMI are overcome when a utility uses an AMIS. With an integrated AMIS, no longer will management ask, "Why can't I use the outage information?", or "Why am I still sending people out for special reads?" The AMIS supports the processes to use the AMI information and realize the benefits forecast in the business case and helps capture the data to document the savings. With an AMIS these processes are complimentary and integrated with existing CIS and utility systems without forcing major upgrades or wholesale replacements which destroy the ROI.

Minimize Total Cost of Ownership
The O&M costs of an AMI over its lifecycle generally exceed the upfront capital costs and may dominate the cost side of the business case. An AMIS is essential to controlling and managing these costs. The AMIS automates O&M processes across multiple AMI technologies with a common management platform, integrating them with existing utility best-practices and systems, and making data available throughout the enterprise. This reduces the "change management" and transition costs, but more importantly, minimizes the on-going cost of operating an AMI. And by using a common integration platform the IT support is minimal.

Strategic Value
With an AMIS the utility is not limited to a single AMI technology and as new enhanced capabilities and solutions are brought to market, the AMIS provides the infrastructure to "snap in" these systems offering new utility and customer services. With a flexible, standardized approach to operating and managing an AMI, the utility can further leverage its investments in AMI and best practices developing synergies through mergers and acquisitions. A utility may even provide AMI operations and management services to other utilities using its flexible, AMIS-based solution.

Risk Management
With an AMIS such as the *PIPe*, the utility minimizes implementation risk by leveraging over 100 person-years of experience deploying and operating AMI solutions. A *PIPe*-managed AMI implementation includes comprehensive process maps and a deployment roadmap that covers all the bases – no surprises. During the rollout the AMIS provides the tools to quickly and easily resolve process and data exceptions so that they don't slow deployment – and add to the cost. After deployment, with the ability to fold in new AMI systems, the utility avoids a "big bang" conversion and upgrades or migrates as needed, when needed.

eMeter brings to its utility partners, in addition to the proven *PIPe*, highly specialized knowledge and skills, best practices from projects and utilities around the country and deep technology insight from relationships with a wide range of meter and communication providers. eMeter also brings field-hardened operating expertise from daily collection and management of data from customers representing over $3 billion in annual electricity revenues.

PIPe Technology

The *PIPe* is a multi-functional AMIS built with a scalable, N-tier, distributed architecture that includes secure web-based services and interfaces. Adapters are configured to integrate with utility legacy systems using a mixture of real-time and batch techniques as appropriate. Adapters to metering and data communications systems translate proprietary, technology-specific data into open, generic XML-based formats. The eMeter Message Bus moves data from collection to repository and coordinates processing by Java-based application modules along the way.

The solution can operate in either a UNIX/Linux or Windows-based environment, or a combination. Oracle database technology powers both the AMI Management Database as well as the Metered Usage Data Repository. The AMI Management Database maintains the complex relationships between meter and network assets, service premises, customer accounts, rates and tariffs, system provisioning and configuration, application services, and user privileges to name a few. The Metered Usage Data Repository stores the data collected and processed from the meters, including daily and real-time register readings, interval usage data, event logs, outage history, as well as derived data such as billing determinants and aggregations and Key Performance Indicators.

The robust architecture not only ensures performance as the system scales, but also provides "5 nines" reliability with server fail-over and hot-standby capabilities. Online backups and archiving are standard and hot-upgrades make the *PIPe* a true 7 x 24 x 365 solution.

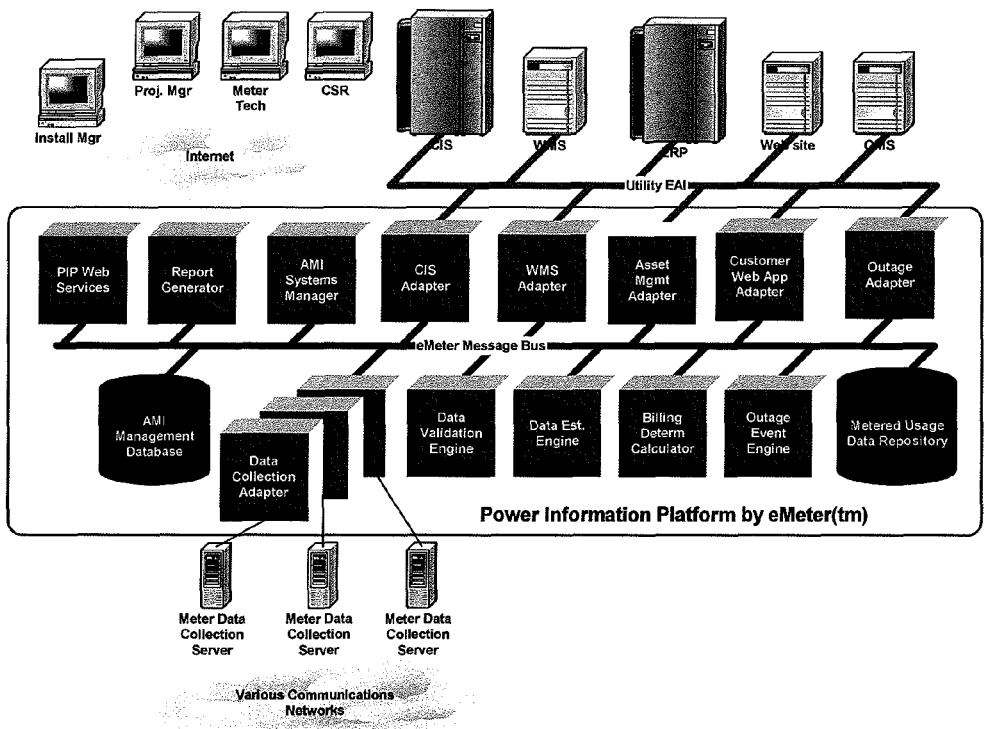

Figure 4 – Power Information Platform™ Architecture

PIPe Features

The *PIPe* is structured with several modules to enable a flexible implementation as plans and requirements evolve, new processes are implemented, and equipment is installed. *PIPe* modules are of three types: Core System, Applications, and Interface Adapters.

Core System
- Meter Data Management System: includes the meter usage data repository and AMI management database; manages data collection from the AMI systems,
- Web Viewer: provides user access for utility and/or partner personnel,
- AMI Systems Manager: monitors AMI software and systems, including data communications; coordinates data synchronization with utility systems to ensure all have consistent, reliable, and accurate data,
- *PIPe* Message Bus: the middleware infrastructure that enables easy, robust linking of all the system elements, including batch or real-time event handling,
- Report Generator: generates management and operator reports, with a focus on Key Performance Indicators, and Business Activity Monitoring
- Data Validation Module: validates and identifies exceptions in data retrieved from AMI meters, and
- Service Manager: creates and tracks field service orders required to resolve meter or communications problems of AMI systems, maintains a audit trail on all business activities and processes.

Application Modules
- Outage Event Manager: filters, processes, and reports outage event data reported by AMI meters, includes synchronization with OMS or DMS circuit node databases,
- Asset Manager: manages meters, data communication modules, communication nodes, and other AMI system assets,
- Data Estimation Module: estimates values for missing data based on utility-approved algorithms for billing cycle reads, daily data presentation reads, or both,
- AMI Diagnostics & Error Flag Manager: manages and processes error flags reported by AMI meters and communication nodes and automatically generates field orders,
- Usage Data Exception Manager: checks reported usage data for items such as excess usage on inactive account, meter reset, and other potential problems,
- Energy Diversion Manager: checks meter reads, flags and exceptions and reports situations that may indicate energy theft,
- On-Demand Meter Read Module: enables utility personnel to read a any meter from any AMI system on demand, from a single interface,

- Transformer Load Manager: uses "virtual meter channels" to calculate peak loads on distribution transformers to identify potential overload and underutilized situations, and
- Installation Manager: manages meter installation processes, ranging from scattered individual meters to large-scale deployments, includes materials forecasting and logistics support, field work scheduling and coordination and process management and data capture interfaces.

Interface Adapters

- Billing Adapter: links the AMI system to the utility's billing system, including daily data synchronization,
- CIS Adapter: links the AMI system to the utility's CIS system, including daily data synchronization,
- Outage Adapter: links the AMI system to the utility's outage management system,
- WMS Adapter: delivers field orders to work management systems and captures result data,
- ERP Adapter: generates equipment and service purchase requests, communicates materials movements and location updates, provides asset status summaries for financial reporting,
- Data Collection Adapter: links different meter data collection systems (wireless, telephone, power line carrier, etc.) to the Meter Data Management System, and
- Custom Adapters: the eMeter Message Bus technology makes the generation of custom adapters straight-forward and provides access to all of the data and services of the *PIPe* for future, perhaps yet to be envisioned, applications

Summary

An AMIS supports successful advanced metering from pilots and commercial/industrial programs to large fixed-network rollouts and helps utilities achieve specific goals that include:

- Meeting cost and performance goals for AMI meters and associated communications networks and systems,
- Resolution of scalability, reliability, and security issues,
- Seamless data management and integration with utility systems,
- Dependable communications management and systems maintenance,
- Support of implementation best-practices and procedures, and
- Efficient operations and coordination with several utility departments In the end, the purpose of an AMIS is to help a utility meet its strategic objective - realizing the full potential of its AMI investment.

APPENDIX B

eMeter Executive Brief:

TXUED Case Study

Introduction

In summer 2005, following a detailed review of business and functional requirements, TXU Electric Delivery selected the *Power Information Platform*™ by *eMeter*, or *PIPe*, to support TXUED's deployment of fixed-network Automatic Meter Reading (AMR – also known as AMI). TXUED plans to deploy AMR to all of its three million customers over the next three to six years. TXUED will use eMeter's *PIPe* (sometimes called a Meter Data Management System, or MDMS) to support the AMR deployment, manage the data from those systems, and support the AMI operations. TXUED's business partner, Capgemini Energy, owns and operates TXUED's billing and many other IT systems and has an important role in the implementation as well. This case study describes the implementation of eMeter's software at TXUED.

TXUED, headquartered in Dallas, Texas, operates the largest distribution and transmission system in Texas, providing power to three million electric delivery points over more than 100,000 miles of distribution and 14,000 miles of transmission lines. TXUED employees are responsible for maintaining and upgrading this infrastructure, which is crucial to the economic well-being of its communities. TXUED is charged with ensuring that the frequency and duration of electrical outages – whether due to storms, accidents or equipment malfunctions – meet or exceed industry standards. TXUED also strives to provide superior service to its electricity customers through a continual investment in new equipment, rebuilding and upgrades to its transmission and distribution system.

Capgemini and TXU Corporation created Capgemini Energy Limited Partnership in 2004 to provide business process services and information technology solutions to TXU. Capgemini Energy provides information technology, call center, billing, human resources, supply chain, accounts payable, finance and accounting services to TXUED and other energy companies. Capgemini provides information technology consulting and services worldwide.

TXUED's Business Requirements

TXUED created a specific Asset Management/IT project team to work closely with the AMR team to define the data strategy and architecture necessary to fulfill TXUED's business process requirements, including those related to changes resulting from electric restructuring. TXUED saw a gap between its existing IT infrastructure and the systems and tools provided by AMR suppliers. Existing systems were built around monthly billing and have not had to contend with the new complexity driven by AMI systems delivering multiple data types and doing so more often. TXUED has also been a supporter of emerging standards efforts including the EPRI IntelliGrid™ program. TXUED decided on a middleware and standards-based architecture to integrate the AMR systems and to minimize changes to its legacy systems. In addition, TXUED determined that it needed a data model that would support a wide

variety of potential future systems and applications, ranging from Broadband over Power Line (BPL) to distribution automation.

At the conclusion of its planning process, TXUED established the primary business requirements for an MDMS. These included specific requirements in the areas of:

- Standardization – including a requirement to use open standards for future systems interfaces and built on a commercial off-the-shelf product that supports current TXUED business processes,
- Technology – that is reliable and scalable to handle TXUED's vision of providing hourly interval data for all metered accounts, and meets TXUED IT standards,
- Security – that conforms to TXUED standards and supports SOX compliance,
- Data Transfer – between multiple AMR systems as well as legacy applications supporting both real-time and scheduled processes, and
- Functionality – supporting all current TXUED revenue cycle services, AMR installation and with configurable business rules and logic to support AMR operational processes.

TXUED estimated that the implementation costs of its MDMS, including integration with its legacy systems would be no more than 10% of its total AMR deployment budget.

TXUED's MDMS Functionality

TXUED required that the MDMS provide the following functions:

- <u>Managing the AMR meter installation.</u> This ranges from planning to installation work orders to verifying that everything is configured correctly to transitioning from manual to automated reading. A critical element is managing the cutover process in such a way that the CIS is unaware and unaffected by the move from manual reads to AMR reads.
- <u>Receiving – and sending – data from/to the AMR meters.</u> Data received includes meter reads, outage events, other events such as meter failures, other meter information such as voltage data, and any other data collected via the AMI system. This function includes requesting an on-demand meter read, sending configuration data to meters, issuing control commands to appliances or equipment linked to a variety of networks.
- <u>Managing AMR data.</u> This includes performing validation, editing, and estimation (VEE), posting the data to the metered usage data repository (MUDR - sometimes called meter data warehouse), and managing the MUDR. This also includes framing of quarter-hourly and hourly data into billing determinants (e.g. peak, off-peak, and super peak usage quantities for a given month that the billing system can then use to calculate the bill); automatic pre-processing and filtering of outage data; and similar applications.
- <u>Integrating with external systems.</u> This includes AMR head-end computers on the one hand and legacy billing and customer

information systems, load control dispatch systems, and Web data presentation systems on the other hand. It includes delivering data to external systems, receiving configuration data from those systems, synchronization with those systems, issuing and tracking of work orders when data problems occur, and so on.

- <u>Managing change.</u> This includes making sure that systems are synchronized and updated in a timely fashion so that users of data are unaffected as meters change, exceptions occur, new AMI systems are introduced, etc.
- <u>Providing administrative functions.</u> This includes:
  - Provisioning AMR meters in the MUDR (i.e. ensuring the meter is installed, collecting data, and communicating it timely and reliably to the database),
  - Maintaining synchronization with legacy billing and customer information systems,
  - Maintaining synchronization with AMR head-end computers to support the data collection processes,
  - Monitoring the quality and timely receipt of meter reads and event data,
  - Issuing alerts to utility field personal and system operators upon discovery of missing or erroneous data and tracking these "trouble tickets" through to resolution,
  - Tracking of the data necessary to perform the MDMS functions, such as tracking the relationships between customers and their rate schedules (e.g. so the *PIPe* knows what data to expect for each premise),
  - Producing operational and management reports on data accuracy, timeliness, reliability, etc., and
  - Providing service-level reporting for each AMR system (TXUED is supporting five different data collection technologies at the outset).
- <u>Providing the AMI Management Database.</u> This includes:
  - Storing the complex relationships among the meter, account, premise, service point, communications node, and the AMR infrastructure
  - The AMR systems and services management data, object relationships and histories
  - Records for assets, premises, accounts, meters, services, service requests, activities, activity outcomes, and more
  - Tracking of not only the current status but also the historical relationships and service history
- <u>Providing the Metered Usage Data Repository (MUDR).</u> This includes:
  - Storing raw data received from AMR systems,
  - Storing processed (VEE'd) data received from AMR systems,
  - Having a standard interface for export of data to TXUED systems such as load research and distribution planning.

Implementing the MDMS at TXUED

TXUED will use eMeter's *PIPe* software as the IT foundation for its AMR operations. eMeter will install and configure the *PIPe* in TXUED's data center. One of the *PIPe's* first tasks is to support TXUED's deployment of 500,000 Distribution Control Systems Inc. (DCSI) AMR devices.

Upon installation, the *PIPe* will capture and store meter readings from TXUED's TWACS AMR system, MV-90 meter data collection system, two other AMR systems, and existing hand-held, manual meter reading systems. Thus, from the beginning, the *PIPe* will manage data from all three million TXUED customers. Data will be consolidated in the *PIPe*, validated for integrity and accuracy, and integrated with TXUED's billing and service order management applications.

The integrations with AMR systems, including the TWACS head-end software (TNS) and MV-90, are smart interfaces rather than simple file transfers. These are tighter integrations with the flexibility to change and manage the AMR system behavior as TXUED's operating requirements and business processes evolve.

The *PIPe* will perform Business Process Monitoring of critical AMR Operations activities and generate Key Performance Indicators to ensure effective deployment and operation of TXUED's new AMR infrastructure. The *PIPe* will provide a common interface into each TXUED legacy application, independent of the AMR and field metering systems, and make information available across TXUED to utility users and, as appropriate, customers, retailers and partners.

The *PIPe* is being implemented at TXUED in three phases:

- Phase 1 – Develop detailed implementation requirements definition for business processes, system interfaces, system architecture and training and develop the overall project plan. This Phase was completed in November 2005.
- Phase 2 – Configure and install the *PIPe* to support the installation of the meters and the monthly (cycle) and off-cycle billing from all three million TXUED meters. Integrate with existing AMR and hand-held data collection systems. Integrate with TXUED's billing system. Identify and track service requests, and synchronize with the appropriate TXUED information systems.
- Phase 3 – Install adapters and configure the *PIPe* to support additional functionality including support for outage and restoration processes, complex billing determinant processing, integration of additional AMR technologies, and provision of data for distribution planning purposes.

Overview of *Power Information Platform*™ by eMeter

The *PIPe* is a multi-functional MDMS built with a scalable, service-oriented, distributed architecture that includes secure web services-based interfaces. Adapters are configured to integrate with utility legacy systems using a mixture of real-time and batch techniques as appropriate. Adapters to metering and data communications systems translate proprietary, technology-specific data into open, generic XML-based formats. The eMeter Message Bus moves data from collection to repository and coordinates processing by Java-based application modules along the way.

For TXUED, the solution will be deployed in the Capgemini Energy datacenter on IBM pSeries servers running AIX. The *PIPe* is operating system independent and can be used in either a UNIX/Linux or Windows-based environment, or a combination. Oracle database technology will power both the AMI Management Database as well as the Metered Usage Data Repository. The AMI Management Database maintains the complex relationships between meter and network assets, service premises, customer accounts, rates and tariffs, system provisioning and configuration, application services, and user privileges to name a few. The Metered Usage Data Repository stores the data collected and processed from the meters, including daily and real-time register readings, interval usage data, event logs, outage history, as well as derived data such as billing determinants and aggregations and Key Performance Indicators.

The robust architecture not only ensures performance as the system scales, but also provides "5 nines" reliability with server fail-over and hot-standby capabilities. Online backups and archiving are standard and hot-upgrades make the *PIPe* a true 7 x 24 x 365 solution.

The *PIPe* is structured with several modules to enable a flexible implementation as plans and requirements evolve, new processes are implemented, and equipment is installed. *PIPe* modules are of three types: Core System, Applications and Interface Adapters. Core System modules provide the foundation functions: the databases, the message bus and the basic data management applications. Application modules support specific functions such as outage management and advanced billing data pre-processing (framing of billing determinants). *PIPe* adapters are smart interfaces, configured to integrate with each TXUED legacy system.

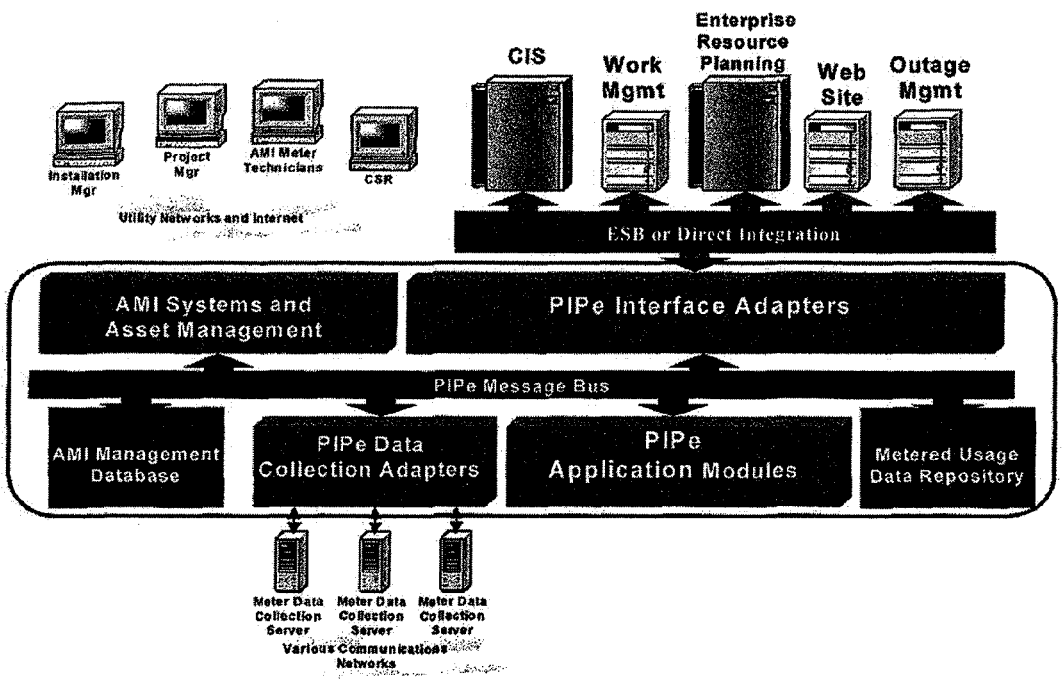

Figure 1 – Power Information Platform by eMeter™ Architecture

Summary

TXUED believes that selecting the *PIPe* will help it achieve multiple goals for its MDMS project:

- Fulfilling all of the business and functional requirements set out for the MDMS project,
- Putting in place a standards-based and Enterprise Application Integration (EAI)-oriented architecture to allow new systems, both AMR and business applications, to easily integrate with and use data from the *PIPe*,
- Meeting cost and performance goals for AMR meters and associated communications networks and systems,
- Resolution of scalability, reliability, and security issues,
- Seamless data management and integration with utility systems,
- Support of implementation best-practices and procedures, and
- Efficient AMR operations and coordination with multiple utility departments.

In the end, TXUED is counting on eMeter's *PIPe* to help TXUED meet its strategic objective: realizing the full potential of its MDMS and AMR investments.

APPENDIX C

Additional Information for Message Bus-Based MDMS Patent Application
July 31, 2007

1. Interfaces between the message bus and the meter data collection system and the utility application.

EnergyIP Adapters are used to interface EnergyIP to core utility business systems and to AMI data collection systems. EnergyIP uses an internal TIBCO messaging infrastructure to support EnergyIP's internal publish-subscribe message-based, service oriented architecture. EnergyIP Adapters subscribe to real-time messages published by EnergyIP applications (e.g. outage events) and provide the data transformation necessary to provide data in the destination system's native format. An EnergyIP Adapter may connect to the utility's EAI or directly to a core business application system. Direct connection Adapters may write to a database staging table, write a file to a destination directory, or stream XML data to an http port.
Some Adapters may query the AMI Management Database or the Metered Usage Data Repository directly. For example, EnergyIP's Data Exporter Application currently exports 15-minute interval data to utility advanced billing systems for large customer billing by creating an interval data export file in native MV-90, HHF or CMEP format and placing this file in a secure FTP directory.
Core utility business systems that send information to EnergyIP can utilize either real-time or batch interfaces. For real-time interfaces, EnergyIP Adapters listen for messages from a utility's ESB. The Adapters can also be configured to regularly scan database tables or file directories for updated information from utility systems. EnergyIP Adapters support message correlation and delivery verification to ensure robust integration. EnergyIP Adapters are template based and implemented in Java using tools integrated with the Rendezvous messaging system.
During implementation, eMeter configures the EnergyIP adapters to implement the utility's required interfaces to the various core business systems as well as the AMI data collection systems. Information on specific adapters is provided below.

2. database on relationship data between meters and other assets and services
EnergyIP has been developed to serve as a central data and service hub for all AMI-related activities. It includes a comprehensive data model that defines the key relationships and identifiers necessary to support the business functions AND the external system interfaces. The key identifiers and data services configurations are critical to operating and maintaining operational interfaces that support the desired services. The EnergyIP solution has been developed to decouple data sources (e.g. AMI systems) from data users (e.g. utility systems) and to manage the sources and uses services in a highly automated fashion. The system provides support for both request/response operations as well as asynchronous operations (i.e. publishing data and events as well as receiving data and events). This combination of services capabilities, services management and state maintenance is useful for to effective integration.
The AMI Management Database is the data store that maintains the complex relationships among the meter, account, premise, service point, communications node, AMI infrastructure, and the applications services under the direction of the AMI Systems Manager. The AMI Management Database includes all the AMI systems and services management data, object relationships and histories. This database contains records for assets, premises, accounts, meters, services, service requests, activities, activity outcomes, and more. This database tracks not only the current status but also the historical relationships.

3. How does a software application module modify data from the meter data collection system prior to storing it?

The EnergyIP Validation, Editing, and Estimation (VEE) Module performs interval data validation, billing cycle validation, and estimation according to configurable rules. The VEE Module enables utility personnel to perform manual data editing as well. All data is stored in the MUDR, including pre-VEE meter data, error conditions, estimated data, and data delivered for billing. Estimates and edited reads are flagged and tracked. All actions taken to approve or edit these data sets are logged and recorded against the service request to maintain an audit trail. The VEE process is illustrated below.

4. How is synchronization performed between the three systems: the meter data management system, the meter data collection system and utility application?

The EnergyIP Data Synchronization Engine is the functionality that manages the synchronization of data between EnergyIP and other systems. These systems include the AMI data collection systems, the utility's core business systems, and the various EnergyIP elements. The Data Synchronization Engine ensures that any changes in data elements and/or relationships in one of the utility core business systems are identified and the appropriate changes are reflected in EnergyIP. Additionally, this capability ensures that the AMI data collection systems are also updated with any required changes. These synchronization processes may be configured with EnergyIP as the slave or the master with respect to utility systems. EnergyIP is generally the data reference master to AMI data collection systems. Synchronization processing automatically generates and logs "exceptions" when attempts to synchronize data cause invalid or erroneous results.

EnergyIP supports integration in the following ways:

Web-services APIs for external systems to request data or to deliver data to the MDMS. These interfaces are appropriate to web-based applications (e.g. customer-facing web presentment of usage data, CSR tools for addressing customer service questions).

Web-services APIs are also suited to ESB integration for generally purpose application support throughout the enterprise.

Client/Server solutions may be readily integrated using shared staging tables where EnergyIP will post data for the remote system to access and/or will scan tables for data to be processed by MDMS. EnergyIP has delivered billing and load research data to staging tables in this manner. The system has also been integrated with client/server-based OMS to deliver outage event records as well as pickup restoration/clearance notifications and to automatically verify power status using the AMI capabilities.

Mainframe integration is supported through file exchanges for primary synchronization purposes as well as billing data exchanges (including standard MRE/MRI file transactions). Mainframe integration using IBM's MQSeries interfaces is also supported for incremental data updates, off-cycle reads, connect/disconnect commands and field work-related transactions.

5. How are applications added (or deleted) and how is access to the message bus by these applications controlled? How do they gain access or publish or retrieve data from the message bus.

EnergyIP has been developed with a service-oriented architecture and is composed of loosely coupled service modules sharing a high-performance messaging bus. It fully utilizes the publish-subscribe capabilities of this bus to operate in a distributed, load balanced, and fault-tolerant manner. This internal architecture also enables independent operation and update of application module functionality making support and maintenance much easier. This experience helps eMeter integrate effectively with a utility SOA..

It is claimed:

1. A meter data management computer system for managing meter data, said system in communication with a meter data collection system that collects meter data from a plurality of meters recording utility usage, said meter data management system comprising:
- a data collection interface to the meter data collection system;
- a message bus for transferring meter data or information derived from the meter data between the meter data collection system and the data collection interface;
- a plurality of software applications connected to the message bus for cleaning, validating, estimating and archiving meter data or information derived from the meter data, said software applications communicating with one another and with said data collection interface through the message bus; and
- flags shared by the data collection interface and the plurality of software applications, wherein each of a number of messages published on the message bus contains one of said flags and is accessible by the plurality of software applications connected to the message bus, the plurality of software applications retrieving only messages of interest based on the flags in the messages.

2. The meter data management computer system of claim 1, wherein said plurality of software applications comprises a software application for cleaning the meter data or information derived from the meter data, a software application for validating the cleaned meter data and a software application for estimating any missing meter data from the cleaned meter data.

3. The meter data management computer system of claim 2, said meter data management system further comprising an archiver and a meter data database, wherein said software application for validating the cleaned meter data publishes validated meter data on the message bus, and said archiver retrieves said validated meter data from the message bus, without involving the software application for estimating missing meter data from the cleaned meter data, and stores the validated meter data in the meter data database.

4. A method for managing meter data performed by means of a meter data management computer system in communication with a meter data collection system that collects meter data from meters recording utility usage, said meter data management computer system comprising:
- a data collection interface to the meter data collection system;
- a message bus for transferring messages related to the meter data between the meter data collection system and the data collection interface; and
- a plurality of software applications for cleaning, validating, estimating and archiving meter data or information derived from the meter data, said software applications communicating with one another and with said data collection interface through the message bus,
- flags shared by the plurality of software applications;

said method comprising:
- a first software application of the plurality of software applications publishing on the message bus a message related to said meter data or information derived from the meter data and containing one of said flags, wherein said message is accessible by said plurality of software applications;
- a second software application of the plurality of software applications retrieving the message published by the first software application based on said flag in such message;
- a third software application of plurality of software applications ignoring the published by the first software application based on said flag in such message; and
- cleaning or validating the retrieved meter data or information derived from the meter data.

5. The method of claim 4, said second software application of the plurality of software applications retrieving from the message published by the first software application the cleaned meter data and validating the cleaned meter data.

6. The method of claim 5, further comprising:
- said second software application determining whether the cleaned meter data contains data gaps and needs data estimation; and
- said second software application publishing on the message bus a message that the cleaned meter data requires data estimation.

7. The method of claim 6, further comprising a fourth software application of the plurality of software applications retrieving from the message bus the cleaned meter data requiring data estimation, and providing estimated data.

8. The method of claim 7, said meter data management computer system further comprising an archiver, said method further comprising said second software application publishing validated meter data on the message bus, and said archiver retrieving said validated meter data from the message bus, without involving the fourth software application, and archives the validated meter data.

9. The computer system of claim 1, each one of said interface and software applications publishing messages on the message bus without waiting for publication of information by any other entity on the message bus to be completed.

10. The computer system of claim 1, said interface or said software applications publishing some of said messages, each of at least some of said messages published by said interface or said software applications including a corresponding identifier indicating a characteristic of content of such message, and one of said software applications retrieves from the message bus at least one message of interest based on the characteristic indicated by the identifier.

11. The computer system of claim 1, wherein publication and retrieval of said messages by each of said software applications do not affect the publication and retrieval of said messages by any other one of the software applications.

12. The computer system of claim 1, the message bus enabling information to be simultaneously published on the message bus by each of the interface and the software applications.

13. The method of claim 4, each one of said interface and software applications publishing messages on the message bus without waiting for publication of information by any other entity on the message bus to be completed.

14. The method of claim 4, said interface or said software applications publishing some of said messages, each of at least some of said messages published by said interface or said software applications including a corresponding flag indicating a characteristic of content of such message, and each of said software applications retrieves from the message bus at least one message of interest based on the characteristic indicated by the flag.

15. The method of claim 4, wherein publication and retrieval of said messages by each of the interface and said software applications do not affect the publication and retrieval of said messages by any other one of the interface and the software applications.

16. The method of claim 4, the message bus enabling information to be simultaneously published on the message bus by each of the interface and the software applications.

* * * * *